April 21, 1953 J. W. DICKEY ET AL 2,635,457
FREEZEMETER
Filed Feb. 4, 1952 3 Sheets-Sheet 1
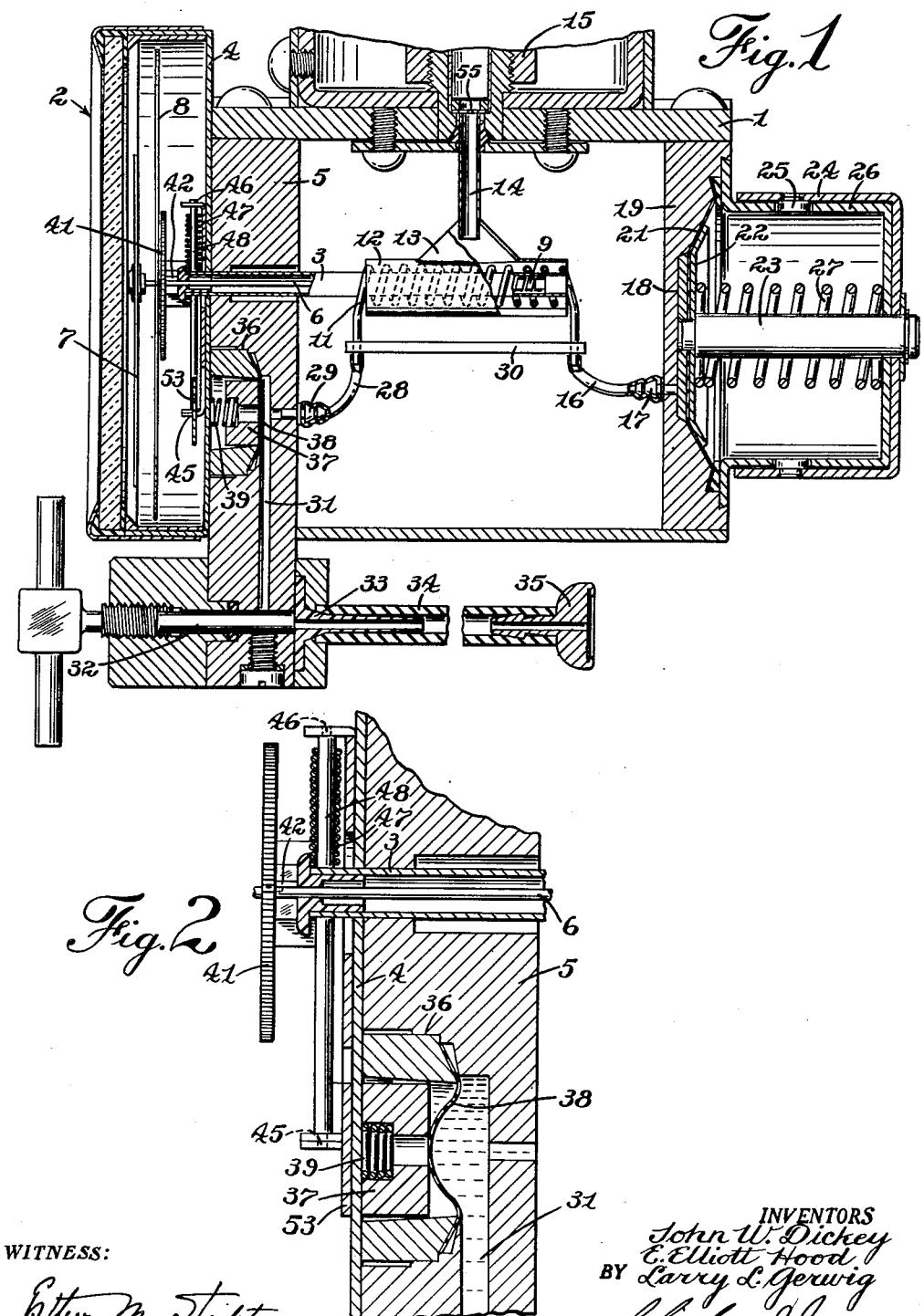
INVENTORS
John W. Dickey
E. Elliott Hood
BY Larry L. Gerwig
Clinton S. Janes
ATTORNEY
WITNESS:
Esther M. Stockton April 21, 1953
J. W. DICKEY ET AL
2,635,457
FREEZEMETER
Filed Feb. 4, 1952
3 Sheets-Sheet 2
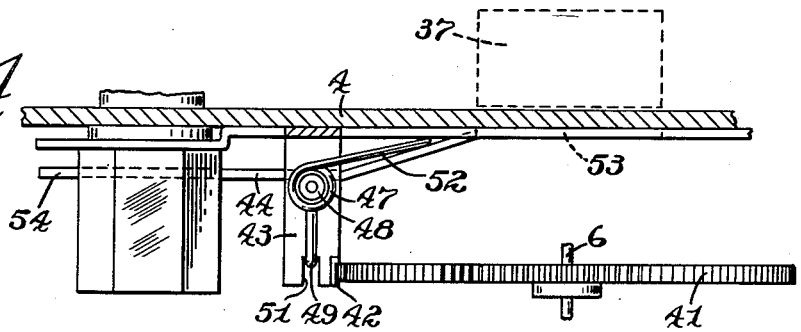
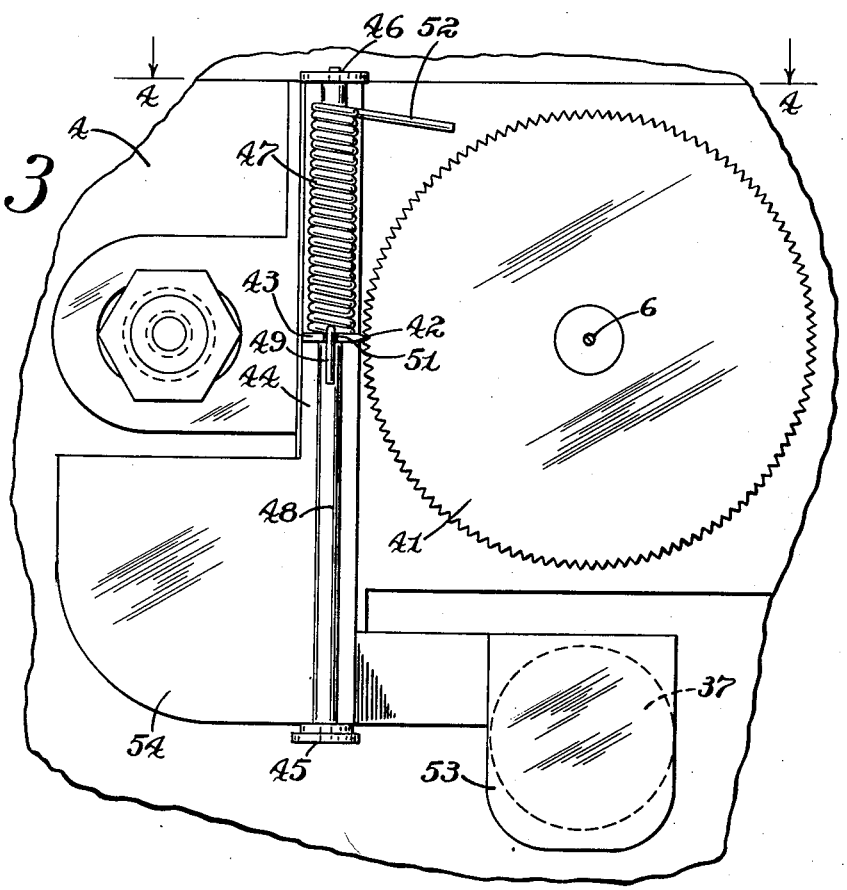
WITNESS:
Esther M. Stockton
INVENTORS
John W. Dickey
E. Elliott Hood
BY Larry L. Gerwig
Clinton S. Janes
ATTORNEY April 21, 1953 J. W. DICKEY ET AL 2,635,457
FREEZEMETER
Filed Feb. 4, 1952 3 Sheets-Sheet 3

WITNESS:
Esther M. Stockton

INVENTOR.
John W. Dickey
E. Elliott Hood
BY Larry L. Gerwig
Clinton S. Janes
ATTORNEY Patented Apr. 21, 1953

2,635,457

UNITED STATES PATENT OFFICE 2,635,457

FREEZEMETER

John W. Dickey, Newfield, E. Elliott Hood, Elmira, and Larry L. Gerwig, Elmira Heights, N. Y., assignors to Bendix Aviation Corporation, a corporation of Delaware Application February 4, 1952, Serial No. 269,844

5 Claims. (Cl. 73—17)

The present invention relates to a freezemeter and more particularly to an apparatus for determining accurately the thawing point of liquids of unknown composition. The present disclosure is an improvement on the structure shown in the application of Dickey, Serial No. 83,986, filed March 28, 1949, and assigned to the assignee of the present application.

In the Dickey application there is disclosed a device for inducting a sample of a liquid to be tested into a tube which surrounds the stem of a thermometer, freezing the sample, allowing it to thaw, and retaining the reading of the thermometer at the thawing temperature. It is an object of the present invention to provide novel and improved structure for automatically arresting the movement of the thermometer pointer when the sample has thawed sufficiently to begin to flow.

It is another object to provide such a device in which the casing of the thermometer which houses the pointer, is hermetically sealed from the liquid to be tested.

It is another object to provide such a device in which the arresting means is actuated magnetically from the exterior of the thermometer casing.

It is another object to provide such a device in which the arresting mechanism is of balanced construction so as to be unaffected by movement of the instrument.

Further objects and advantages will be apparent from the following description taken in connection with the accompanying drawings in which:

Fig. 1 is a vertical substantially mid-sectional view of a freezemeter constituting a preferred embodiment of the invention;

Fig. 2 is an enlarged sectional detail of the magnetic arresting means for the thermometer shown in operative position;

Fig. 3 is an enlarged detail in side elevation of the arresting means for the thermometer;

Fig. 4 is a section taken substantially on the line 4—4 of Fig. 3;

Figure 5:
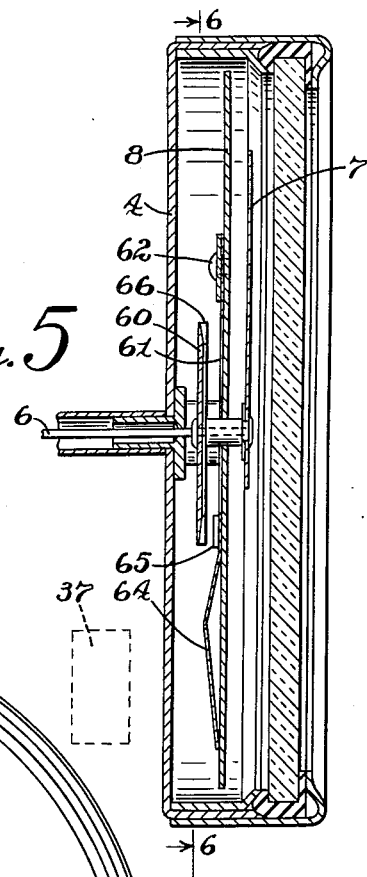
Fig. 5 is sectional detail showing a modified form of arresting means for the thermometer.

In Fig. 1 of the drawing there is illustrated a metallic frame indicated generally by numeral 1 on which is suitably mounted a cylindrical thermometer casing 2 formed of non-magnetic material. A cylindrical stem 3 is coaxially attached to a flat wall 4 of the thermometer casing and extends through a member 5 into the interior of the frame 1. A staff 6 is rotatably mounted in the stem 3 and extends into the thermometer casing 2. A needle 7 is fixedly mounted on the end of the staff 6 in operative relation to a circular dial 8 fixedly mounted in the casing.

The inner end of the needle staff 6 is connected to the stem 3 by means of a spiral of bimetallic ribbon 9 which forms the heat sensitive element of the thermometer. A thin-walled tube 11 is wrapped around the stem 3 so as to surround the heat-sensitive element 9 of the thermometer, and is enclosed in a cylindrical sheath 12 which is connected by a funnel-shaped duct 13 to a nipple 14 extending from a source of liquified gas such as a carbon dioxide flask 15.

One end of the tube 11 is connected by a hose 16 to a nipple 17 extending from a chamber 18 in the frame member 19. Means for drawing a sample of the liquid to be tested through the tube 11 into the chamber 18 is provided in the form of a diaphragm 21 operated by a piston 22 fixed on a stem 23 which is swivelled to a rotatable cup-shaped member 24 having an inclined pin and slot connection 25 with an inner cup member 26 suitably fixed to the frame member 19. A spring 27 is located between the piston 22 and the bottom of the fixed cup 26, and normally holds the piston in the extended position shown in Fig. 1.

The other end of the sample tube 11 is connected by a hose 28 to a nipple 29 which connects with a passage 31 in the frame member 5 leading through a manually operable valve 32 to a nipple 33 which is connected by a hose 34 to an inlet fitting 35.

A thermal mass or heat reservoir such as a bar of brass 30 is preferably connected to the ends of the tube 11 which protrude from the sheath 12. When the frozen sample is permitted to thaw, the heat conducted from the bar 30 ensures that the material in the protruding ends of the tube melts before that which surrounds the heat-sensitive element of the thermometer, so that the thermometer accurately indicates the thawing point of the sample.

The frame member 5 is provided with a cylindrical chamber 36 in which is slidably mounted a permanent magnet 37 for movement toward and away from the wall 4 of the thermometer casing 2. The chamber 36 opens into the passage 31, but the opening from the chamber into the passage is closed by an elastic diaphragm 38 against which the magnet is pressed by a spring 39.

According to the present invention means are provided for immobilizing the thermometer needle shaft 6 responsive to the attraction of the magnet 37 when it is moved toward the wall 4 of the thermometer casing. As best shown in Figs. 3 and 4, this means comprises a circular member in the form of a toothed disc 41 fixedly mounted on the needle staff 6 and a pawl 42 which is movable into and out of engagement with said disc. Pawl 42 is formed on an arm 43 extending from an arresting member 44 which is pivotally mounted on the wall 4 of the thermometer casing as shown at 45 and 46 in Fig. 1. A spring member 47 is wound around a shaft 48 which forms part of the pivoting means, and has one end 49 (Fig. 4) engaged in a slot 51 in the end of the arm 43, while the other end of the spring terminates in an arm 52 which bears against the wall 4 of the thermometer casing so as to yieldingly urge the pawl 42 out of engagement with the toothed disc 41.

An armature 53 of magnetic material is mounted on or forms part of the member 44 and is arranged to extend adjacent the wall 4 of the thermometer casing in juxtaposition to the magnet 37.

Means are provided for counter-balancing the armature 53 about its pivotal axis so as to prevent the action of the arresting means from being affected by movement of the instrument. For this purpose, a counter-weight 54 is attached to or made a part of the member 44 and so positioned as to balance the armature 53.

In the operation of this embodiment of the invention, when it is desired to determine the freezing point of a sample of liquid such as the cooling liquid for an internal combustion engine, the inlet fitting 35 is immersed in the liquid to be tested, the valve 32 is opened, and the pump cup 24 is rotated manually to withdraw the piston 22 against the pressure of spring 27 and move the diaphragm 21 so as to draw the liquid through the hose 34, passage 31, hose 28, tubing 11, and hose 16 into the chamber 18. Gas is then admitted through an aperture 55 to the nipple 14 and is conducted by the duct 13 into the sheath 12 surrounding the tubing 11 which is thereby cooled by the expanding mixture of gas and snow below the freezing point of the sample in the tubing 11 surrounding the heat-sensitive element 9 of the thermometer. After the sample is so frozen, the valve 32 is closed and the pump member 24 is released, permitting the spring 27 to apply pressure to the diaphragm 21 and consequently to the liquid within the chamber 18.

The sample is then permitted to thaw by conduction of heat from the circumambient atmosphere and from the connected metallic elements including the thermal mass 30. When the sample melts sufficiently to permit the pressure in the chamber 18 to be transmitted through the tube 11 to the passage 31 in the frame member 5, this pressure, which is trapped by the closure of the valve 32, becomes effective to distend the diaphragm 38 and move the magnet 37 toward the wall 4 of the thermometer casing as shown in Fig. 2. As the magnet approaches said wall and thus comes into proximity with the armature 53 on the other side of the wall, it attracts the armature against the force of the spring 47. The pawl 42 is thereby moved into engagement with the disc 41 so as to hold it, and consequently the thermometer needle 7, in the position indicating the thawing temperature of the liquid.

Figure 6:
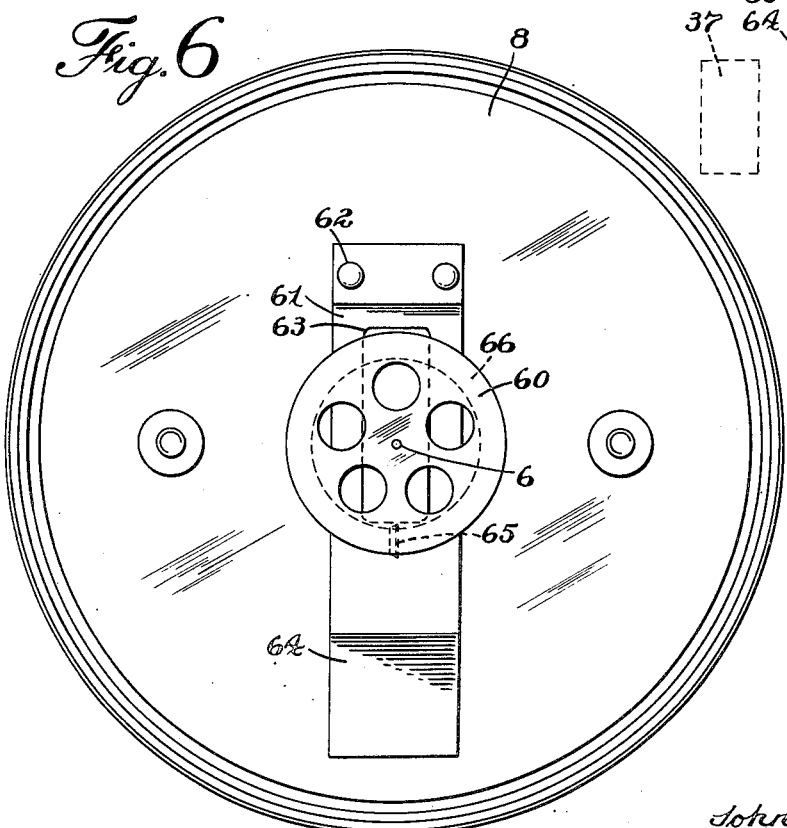
Fig. 6 is a section taken substantially on the line 6—6 of Fig. 5.

In Figs. 5 and 6 of the drawing there is illustrated a second embodiment of the arresting means for the thermometer needle.

As there shown, the thermometer staff 6 which carries the needle 7 has a knurled disc 60 fixed thereon. An arresting member 61 in the form of a strap of spring metal is rigidly mounted as indicated at 62 on the dial 8 of the thermometer. The member 61 is provided with an elongated slot 63 which permits the member to loosely straddle the thermometer staff, and terminates in a slightly off-set portion 64 which is located in alignment with the movable magnet 37. The entire arresting member 61 may be of magnetic material or it may be formed of a non-magnetic material such as phosphor bronze in which case the portion 64 is a separate piece of magnetic material permanently attached to the free end of the member.

The arresting member is provided with a projecting tooth 65 which is arranged in position to be moved into engagement with the knurled surface 66 of the disc 60 when the arresting member is flexed to the left in Fig. 6. Such flexure is caused by the attraction of the magnet 37 for the portion 64 of the arresting member, when the magnet is moved into proximity with the wall 4 of the thermometer casing.

The operation of this form of arresting means is substantially similar to that previously described. When the magnet 37 is moved toward the thermometer casing by the hydraulic pressure built up in the passage 31 consequent to thawing of the frozen sample in the tube 11, the attraction of the magnet for the portion 64 of the arresting member moves the tooth 65 into engagement with the knurled surface 66 of disc 60, and holds the thermometer needle 7 in the position it occupies at the time of thawing of the sample. After the thermometer reading has been noted, opening of valve 32 by the operator permits the sample of liquid to be discharged from the instrument, and the parts to return to normal position.

Although certain structure has been shown and described in detail, it will be understood that changes may be made in the form and arrangement of the parts disclosed without departing from the spirit of the invention.

We claim:

1. In a device for recording the thawing temperature of a liquid, a thermometer comprising a casing of non-magnetic material, a tubular stem projecting therefrom, a needle staff journaled in the casing and stem, a needle in the casing fixed on the stem, a temperature-responsive spiral element in the stem connected at its ends to the needle staff and stem respectively, a tube surrounding the stem, means for drawing a sample of the liquid to be tested through a conduit into the tube, means for cooling the tube and thermometer stem below the freezing point of the sample, means for applying pressure to the frozen sample tending to eject it from the tube, means for preventing the escape of liquid from said conduit, a movable magnet normally held spaced from the thermometer casing, means responsive to pressure built up in the conduit when the sample melts, for moving the magnet toward said casing, and means in the casing actuated by flux from the magnet to arrest the rotation of the needle staff.

2. A recording device as set forth in claim 1 in which the thermometer casing is formed with a flat wall, and including further a frame member having a passage therethru forming said conduit, and a chamber opening into the passage in which said magnet is slidably mounted; an elastic diaphragm closing the opening between the passage and chamber, and a spring holding the magnet against the diaphragm.

3. A recording device as set forth in claim 1 in which the arresting means for the needle staff includes a circular member fixed on the staff, a braking member therefor, means supporting the braking member for movement into and out of arresting engagement with the circular member, said braking member including an armature in the thermometer in juxtaposition to said magnet and arranged to move the braking member into operative position responsive to attraction of the magnet.

4. A recording device as set forth in claim 1 in which the arresting means for the needle staff includes a toothed disc on the needle staff, a pawl movable into and out of locking engagement with the disc, an armature rigidly connected to the pawl, and spring means normally holding the pawl free from the disc, said armature being movable by flux from the magnet as the magnet approaches the casing, to bring the pawl into locking engagement with said disc.

5. A temperature recording device as set forth in claim 3 in which the braking member is pivotally mounted in the thermometer casing, and is provided with a counterweight which balances the armature around said pivotal connection.

JOHN W. DICKEY.
E. ELLIOTT HOOD.
LARRY L. GERWIG.

No references cited.